United States Patent Office 3,639,558
Patented Feb. 1, 1972

3,639,558
IMMUNOLOGICAL REAGENT PARTICLES
HAVING PROTEINACEOUS MATERIALS
COVALENTLY BONDED THERETO
Louis Csizmas, 1737 Inwood Court, and Virendra Patel,
1424 Locust St., both of Elkhart, Ind. 46514
No Drawing. Filed Feb. 19, 1968, Ser. No. 706,688
Int. Cl. G01n 31/00, 33/16
U.S. Cl. 424—12
7 Claims

ABSTRACT OF THE DISCLOSURE

Reactive particles of controlled reactivity and size which are capable of direct chemical attachment to biological substances can be made by coating solid carrier particles with at least one coat of a proteinaceous material by the use of a first coupling agent and then attaching to said proteinaceous coat through covalent bonding a second coupling agent capable of attachment to biological substances through covalent bonding. Insolubilized biological reagents may be produced from such reactive particles merely by mixing these particles with biological substances which will be bound thereto through the second coupling agent. With the use of different coupling agents varying reactivity can be attained, and the desired final particle size will depend upon the number of coats of the proteinaceous material employed.

BACKGROUND OF THE INVENTION

This invention relates to active particles capable of direct chemical attachment to biological substances and the insolubilized biological reagents formed by such a reaction and to the processes for making such particles and reagents. More particularly, the invention relates to reactive particles and insolubilized biological reagents having controlled reactivity and particle size, respectively.

Two general types of particles to which biological substances can at least be temporarily attached have been used in the past. The first type were solid particles such as collodion, latex particles and red blood cells which were used as inert particles to which various biological substances could be temporarily adsorbed due to the surface characteristics presented by such materials. It has been found that many biological substances cannot be adsorbed on such inert particles in a manner to retain them on the surface thereof a sufficient period of time to allow proper use thereof. Typical of the second type of particles were red blood cells which had been treated with formaldehyde in order to stabilize them against lysis and then with a chemical coupling agent such as bis-diazobenzidine. Such particles could be chemically reacted with biological substances by coupling through the coupling agent.

Both of these types of particles are of limited utility due to their fixed reactivity and size. Thus for the second type of particles, the stabilized red blood cells are of fairly uniform size and surface properties, and when the surface properties are altered by attaching chemical coupling reagents, a new chemical reactivity is imparted to the surfaces. Except by the use of differing chemical coupling agents there is no way in which the surface reactivity of these treated particles may be altered, and since the original chemical characteristics of the starting particle always control the selection of the chemical coupling agents, only a very narrow range of reactivity for such particles has been possible in the past.

Another limitation is found in the inability to vary the size and hence the weight of the particles. Some particles, particularly the red blood cells, are small enough so that very long times are required for their sedimentation in certain immunological tests. It is well known that such tests must be observed for periods of 1 to 2 hours in order to determine whether or not agglutination has occurred. These times necessary for testing could be greatly reduced if larger sized particles were available.

It is therefore an object of the present invention to provide reactive particles capable of direct chemical attachment to biological substances which are of larger sizes than and are of variable reactivity as compared to those in the prior art.

Another object of the present invention is to provide particulate insolubilized biological reagents which are of larger size and weight than those available in the prior art.

Yet another object of the present invention is to provide processes by which both of the above reactive particles and the insolubilized biological reagents can be produced.

SUMMARY OF THE INVENTION

The two primary uses for particulate insolubilized biological reagents of the type referred to herein are for conducting immunological testing and for carrying out enzymatic conversions and processes. For the first of these employments the reactivity and the size of the particles to which the biological substances are attached must be carefully controlled. A very large particle size cannot be employed initially since a large particle would be incapable of agglutinating as required for operability of immunological tests. Instead, such particles would immediately sediment, since the particle size and weight would overcome the rather weak agglutination forces. To be useful for the enzymatic conversion processes the reagent particles must be of a filterable size in order to prevent the enzymes from being carried from one stage of the process to a later stage in which their presence is not desired. Hence, larger size particles are necessary.

The present invention provides a method by which initially small particles such as red blood cells, microbial cells and gelatin surfaced inert particles can be used as carrier particles to which one or more coats of a proteinaceous material can be covalently bound through chemical coupling agents. A plurality of such coats may be placed upon the carrier particles so that their final size and weight is much greater than the originally available particles. By following this method greater control over the reactivity available for coupling two biological substances and over the particle size can be attained. The larger sizes are useful due to the fact that the sedimentation times of carrier particles such as *E. coli* can be reduced to 6 to 8 hours from the times of 12 to 18 hours which are required if no coat is useful thereon.

In order to make the reactive particles, carrier particles having proteinaceous outer surfaces are first added to a fluid medium and thereafter at least one proteinaceous material is coupled to said particles by the use of a first chemical coupling agent to form a uniform coat on said carrier particles. Thereafter, a second chemical coupling agent is attached to the outer surfaces of said uniformly coated particles so as to present nonbonded reactive groups capable of reaction with biological substances by the formation of covalent bonding.

In order to form an insolubilized biological reagent by use of such a reactive particle all that is necessary is for a biological substance to be mixed with the reactive particles in a fluid medium. The nonbonded reactive groups present on the outer surfaces of the particles then react with the biological substance and covalently bonds it to said outer surfaces. As described above a plurality of coats of the proteinaceous material can be employed to afford convenient control over the particle size.

While any of a wide range of biological materials can be coupled to the reactive particles of the present invention those substances having antigenic activity provide the most useful biological reagents. Such substances are antigens and haptenes having immunological properties and enzymes having enzymatic properties. These substances are hereinafter termed "antigenic active substances."

At each step in the processes described above, the coupling agents and proteinaceous materials employed can be selected to impart a specific desired reactivity to the outer surfaces at any given stage.

Other advantages of the present invention are that uniform reactive groups are made available by the proteinaceous material at any of the stages. This uniform reactivity is possible because the naturally occurring reactive groups present on the surfaces of such carrier particles as the red blood cells and the microbial cells are rendered inactive when said particles are coated with the proteinaceous material. Another advantage is that since various proteinaceous materials can be employed as coats, highly reactive coupling reagents can be employed with no danger of rupturing the cell walls of the carirer particles when such particles are of a cellular nature since such coupling agents do not contact the cell surfaces. Still another advantage is that a dye or stain can be added in any of the coats so that the reagent particles have greater visibility.

When employing microbial cells and red blood cells for the carrier particles it is sometimes advantageous to eliminate all naturally occurring antigenic sites. This is particularly true where microbial cells are to be employed. It is equally true for testing biological fluids for the presence of immunological materials wherein antibodies to the antigenic groups on the carrier particles may be present which would cause non-specific agglutination and hence false test results if the antigenic sites were left uncovered. Thus, the N-antigen of sheep, horse and beef red blood cells, the Forssman antigen of sheep red blood cells, and the A, B, and AB antigens of human red blood cells can all be covered up by the proteinaceous material coat.

The carrier particles can be red blood cells, microbial cells, gelatin, surfaced particles or mixtures thereof. The red blood cell carrier particles can be any of those recovered from a wide range of animals. Examples of usable red blood cells are those obtained from the following animals: opossum, rat, rabbit, guinea pig, human being, goat, horse, sheep, alligator and turtle. The red blood cells are obtained by extraction of a blood sample from the animal and separation of the red blood cells from the plasma by centrifugation. The red blod cells are then recovered and stored in physiological saline solution prior to reacting them with the first coupling agent.

The microbial cells useful as carrier particles in this invention can be any self-reproducing micro-organism which is propagated with or without dependence upon other organisms. Both gram positive and gram negative bacterial cells can be used. Fungal cells and protozoological cells can likewise be employed, as can viral particles. These are generally unicellular organisms which are occasionally joined in clumps or aggregates. The cells may be used in this form provided their aggregate size does not form a carrier particles which is so large that the test system formed with it will not agglutinate in the presence of a substance which is homologous to the antigenic substance bound to the aggregated cells. Generally, the preferred microbial cells are bacterial cells or aggregates thereof which are of uniform shape and size and have maximum external dimensions in one direction of from about 0.2 to 10 microns. While not preferred, a mixture of different but uniform cells may be used. For these bacteria the usable microbial cells include those in Division I of the Vegetable Kingdom, including Classes I, II, and III, Order I. The Class III, Order I microbial cells include the intracellular viral particles which have maximum dimensions of about 0.2 micron.

Reference may be had to Bergey's Manual of Determinative Bacteriology by R. S. Breed, E. G. D. Murray, N. R. Smith, 7th Edition, 1947, the Williams and Wilkins Company, for a complete listing of usable bacterial cells. Particularly useful are the bacteria of Class II, Suborder II, Family IV (Pseudomonadaceous) and Class II, Order IV, Family IV (Enterobacteriaceae). All Tribes I–V are considered to represent preferred microbial cells for the purpose of this invention. Also Class II, Order IV, families V (Brucellaceae), X (Lactobacillaceae) and XIII (Bacillaceae) and considered preferred. Both Orders I and II of Class III organisms can be employed where smaller particles sizes of about 0.2 micron or under are desired. Particularly, the Order II Virales are of small dimension which limits their usefulness.

*Escherichia coli* is a specially preferred bacterial cell for purposes of this invention. Another specially preferred microbial cell is the commonly available yeast, *Saccharomyces cerevisiae*. The yeast growth phases of the fungal cells are also preferred for use as carrier particles.

Other preferred micobial cells are *Bacillus subtilis*, *Lactobacillus leichmannii*, *Bacillus pumilus*, and *Pseudomonus fragi*.

These microbial cells can be obtained by properly culturing a starter culture of each of them in a nutrient medium. The cells can then be harvested at their maximum growth point.

The proteinaceous surface carrier particles can be formed by coating insoluble particles having a diameter range of about from 0.1 to 10 microns with gelatin, a proteinaceous material, by a technique such as coacervation coating or encapsulation. For example, particles of polystyrene such as set out in U.S. Pat. 3,234,096 to Pollack can be encapsulated by emulsifying them in a gelatin solution nad then spray-drying the emulsion. Only a thin film of gelatin need be deposited on the surfaces of the particles so that the coupling agents can be reacted therewith. Also carrier particles can be made entirely from gelatin together with appropriate cross-linking agents such as a solubilized polyacrolein.

The chemical coupling agents usable as either the first agent or the second chemical coupling agent according to the present invention are generally compounds having two or more of the following reactive groups: azo, sulfonic acid, fluoro groups activated by nitro groups, azide, imine, and reactive chloro groups connected to a ring having proper resonance structures. These reactive groups are capable of reacting with the primary amino, sulfhydryl (mercapto), carboxylic and hydroxyl groups in the materials constituting the surfaces of the carrier particles and the proteinaceous materials as well as the biological substances to be coupled to the reactive particles.

A representative list of such coupling agent is: bis-diazobenzidine, bis-diazobenzidine disulfonic acid, tetra-azo-p-phenylenediamine, difluorodinitrobenzene, difluorodinitrodiphenyl sulfone, a carbodiimide, toluene diisocyanate, cyanuric chloride, dichloro-s-triazine, N-t-butyl-5-methylisoxazolium perchlorate, a dialdehyde, an alpha, beta-unsaturated aldehyde, and mixtures thereof. Some of these coupling agents, notably the cyanurating agents, the dialdehydes and the alpha, beta-unsaturated aldehydes, are capable of preserving the red blood cells and the microbial cells at the same time as they couple to groups on the cell surfaces so that these cells are then stabilized against lysis. Thus, when such coupling agents are used, no separate stabilization or preservation treatment is necessary. For use of the N-t-butyl-5-methylisoxazolium perchlorate the surface to which it is coupled must first be treated with a succinylation reagent such as succinic anhydride.

The carbodiimides which can be employed are, among others, the following: N,N'-dicyclohexyl carbodiimide; 1- ethyl-3(3-dimethylaminopropyl) carbodiimide hydrochloride; and 1-cyclohexyl-3(2-morpholinyl-(4)-ethyl carbodiimide)metho-p-toluene sulfonate. A specific difluorodinitrobenzene which can be employed is 1,3-difluoro-4,6-dinitrobenzene, and a specific difluorodinitrodiphenyl sulfone, which can be employed is p,p'-difluoro-m,m'-dinitro diphenylsulfone.

The coating material for the carrier particles can be any proteinaceous material such as serum albumins or globulins obtained from various animal species or can be other uniform material such as myoglobins or hemoglobins. Particularly preferred is bovine serum albumin which is readily available. Other materials such as ovalbumin, alpha, beta, and gamma globulins can likewise be employed as can beta-lipoprotein and thyroglobulin. It is generally required that the coating material employed be sufficiently homogeneous so that a uniform surface can be obtained by the use thereof. The above materials all meet this criterion.

The biological substances which can be reacted with the reactive particles of the present invention to form insolubilized biological reagents can be any of a wide range of substances having antigenic active properties (as above set out). Thus various antigens having immunological properties including those set out above for use as coating material can be employed. In addition to those set out above, the following can be used: human serum albumin, human chorionic gonadotropin (HCG); blood group A and B antigens, alpha-globulins of the human plasma fraction; gamma globulins from different animal species; human transferrin; trichinella antigen and similar antigenic materials of either pathogenic or natural organisms; leutinizing hormone; insulin; and tuberculin purified protein derivatives.

Another class of antigenic active substances which can be coupled to the reactive particles are enzymes such as diastase, maltase, zymase, amylase, and other enzymes. When an enzyme is coupled to a carrier particle it may be employed to carry out enzymatic conversion processes in a preferred fashion. Thus, the first three of the above listed enzymes can be used in a 3-stage process for the conversion of starch to alcohol while the last enzyme listed can be used to convert starch slurries to sugar syrups. The advantage of employing the enzymes in an insolubilized form by coupling them to reactive particles according to the present invention is that the enzymes do not become co-mingled with the material being processed. The particles are retained in a fixed position or entrapped in a bed through which the material being converted can pass. As another example of an enzymatic conversion process "black-strap" molasses can be converted to alcohol by coupling both invertase and zymase to reactive particles and then passing the molasses thereover.

It is also possible by utilization of the present invention to couple several of these different antigenic active substances to the outer coating layer simultaneously in order to provide reagent particles having multiple reactivity. Thus, human gamma globulin and bovine gamma globulin have been reacted simultaneously to provide reagent particles capable of detecting both of these substances in biological specimens by an inhibition of agglutination test. Also, bovine serum albumin, human gamma globulin and bovine gamma globulin have been employed to provide multiple reactivity for the insolubilized biological reagent prepared according to the present invention.

Since antibodies to these various materials are gamma globulin molecules modified in such a way that they have antigenic receptor sites for the antigens to which they are immunological counterparts, the presence of antibodies can be indicated by their reaction with either their respective antigen or the antibody to the gamma globulin from which they were formed. The antigenic immunological materials referred to herein indicate materials which, when introduced into the circulatory system of an animal produce antibodies specific to that particular antigenic material. Such antigenic materials include serum protein such as gamma globulin and serum albumin or blood grouping substances "A" and "B" from which tests for blood typing can be made as well as the other antigens listed above.

The term "immunological counterpart" as used above denotes either an antigen or an antibody which reacts specifically with the corresponding antibody or antigen.

As mentioned above the reactive particles can be provided with a dye or stain in order to improve the visual distinction presented by the final insolubilized biological reagents from the surrounding background. Stains such as hematoxylin, fuchsin, and crystal violet can be used for this purpose. Another optimal preparation treatment for the microbial cells is to wash them with an organic solvent such as alcohols, ethers, etc. to remove any polysaccharide or wax layers which may be present and might interfere with the reaction between the carrier particles and the coupling agents.

The insolubilized biological reagents of the present invention can be used as immunological indicator particles by reacting the reactive particles with specific antigenic active substances. When the immunological counterpart to the material coupled to the reactive particles is to be detected directly by the use of the immunological indicator particles the testing is referred to as direct agglutination testing and is carried out by mixing the indicator particles with a sample of the fluid suspected of containing the immunological counterpart and observing the resulting agglutination or non-agglutination pattern. The occurrence of agglutination denotes the presence of the material tested for, while the absence of agglutination denotes the absence of the suspected material. Agglutination testing may be carried out by coupling an antigen to the reactive particles of this invention and then directly testing for the presence of the immunological counterpart in the sample fluid.

The same indicator particles can be used for detecting a material having a reactive site similar to the immunological material attached to the reactive particles by inhibition of agglutination testing. For example, when testing for an antigen a quantity of the antibody thereto can be added to the test medium prior to or along with the indicator particles which consist of the reactive particles coupled to the antigen. If the sample fluid contains the antigen, this antigen will react with the antibody added to the testing medium and the antibody will thus be unable to agglutinate with the indicator system. Hence, the agglutination which would otherwise occur is inhibited, and the biological reagents form a sedimentation pattern in the test container. Such agglutination testing can be carried out with the appropriate indicator particles to detect the presence of either antibody or antigen in fluid samples. Thus, either an antigen or an antibody can be detected with the indicator particles of the present invention.

The agglutination testing and the inhibition of agglutination testing are normally carried out according to two methods. One is known as a slide agglutination method and the other is known as the micro-titrator agglutination method. The former relies on mixing of the test reagents and the fluid sample on a flat glass surface and is generally done on only a qualitative basis in order to detect a predetermined concentration of the material being tested for. The latter method is carried out by placing the test reagents for each test in a series of wells formed in a row in the upper surface of a plastic or other suitable plate. The linear arrangement of the wells allows serial dilution of the antibody used for the agglutination or inhibition of agglutination testing. The serial dilution is carried out by first placing 1 drop of a diluent in each of the wells in the row and then adding a 1 drop volume of an initial antibody solution having an initial dilution of, for example, 1:5 to the first well using a loop or spiral calibrated to hold 1 drop of fluid. Next, the loop is submerged in the first well and 1 drop of the fluid is withdrawn and is then mixed with the diluent in the second well. The dilution of the first well is then 1:10 and the dilution of the second well is 1:20. This process of serial dilution is repeated until all of the wells in the row have been treated, thus producing a series of antibody dilutions in each well differing by a factor of ½ from the earlier treated well. For agglutination testing 1 drop of a suspension of indicator particles is added directly to the wells following the preparations of the serial dilutions. If inhibition of agglutination testing is to be conducted, a quantity of unbound antigen generally in excess of the amount of antibody is added to each well prior to the addition of the insolubilized biological reagent. When samples of body fluids are to be tested these are added as the antigen and generally the serial dilutions of the antibody are controlled so that the concentration of the antibody equivalent to the concentration of the antigen expected to be detected lies in the mid-portion of the serial dilution. This procedure allows an identification of the titre of the antigen in the body fluid sample and hence a semi-quantitative determination thereof.

The processes for making the reactive particles and the insolubilized biological reagents of the present invention involve various reaction steps all of which can be and are preferably carried out at room temperature in any of a number of buffered fluid mediums. The carrier particles are dispersed in the fluid medium so that they have a one to 10 percent suspension concentration. These carrier particles are then reacted with the first coupling agent at room temperature (20° C. to 25° C.) for a time period sufficient to allow reaction, usually less than 1 hour. The thus treated carrier particles are reacted with the first coating material by adding the coating material to a fluid medium in which these treated and reactive particles are suspended. The reaction may be carried out for a time period less than 1 hour at room temperature. This series of steps, reacting first with a coupling agent and then with the coating material, can be successfully repeated any desired number of times in order to build up a custom-made particle having the required size and weight for any particular employment. When the desired size and weight have been attained the particle can then be made reactive by treating with a second coupling agent which can be accomplished according to the above description of the first coupling agent and the thus prepared reactive particle can then be directly reacted with any of the above described biological substances. This reaction with the biological substances is likewise carried out in a fluid medium at room temperature.

Generally the coupling agents employed for the present invention will have reactivity great enough to reduce the necessary time for coupling to time periods of 10 minutes to 30 minutes at room temperature.

DESCRIPTION OF THE PREFERRED EMBODIMENT

Microbial cells are the preferred carrier particles since they are easily obtained by well known culturing techniques. While no particular coupling agent is preferred over the others bis-diazobenzidine (BDB) can be employed for all of the coating materials and the biological substances set out herein. The preferred proteinaceous material used for forming the coats about the carrier particles is bovine serum albumin.

The preferred reactive particles can then be formed by culturing microbial cells having non-pathogenic characteristics such as E. coli, harvesting the same, and then reacting them at room temperature in a fluid medium with BDB. The treated carrier particles can then be coated with bovine serum albumin (BSA) by reaction therewith in a fluid medium at room temperature for about 15 minutes.

The coated carrier particles can then be made reactive by another application of the BDB thereto. The thus produced reactive particles can be directly reacted with any of the above described biological substances to form immunological indicator particles or enzymatic conversion reagents.

These and other embodiments of the present invention are further detailed in the following examples which are illustrative only and are not to be construed as limitative of the invention. The terms "saline" and "saline solution" refer to physiological saline solution of 0.85% concentration.

EXAMPLE I

Ten (10) ml. of a 2.5% suspension of formalinized E. Coli cells were washed three times in saline solution. After the last centrifugation the supernatant was discarded and 0.25 ml. of the packed cells were resuspended in 6 ml. of phosphate buffer, pH 7.33. Next, 5 ml. of bovin serum albumin (BSA) in saline (40 mg./5 ml.) were added thereto. Twenty (20) ml. of bis-diazobenzidine diluted 1:5 in phosphate buffer and saline, pH 7.3, were then added thereto and the entire mixture placed upon a rotary shaker for 20 minutes at room temperature. The cells turned to a brownish color during this time. The preparation was then centrifuged and resuspended in 0.6% BSA in saline and allowed to further react for 15 minutes at room temperature. It was then washed three times with saline solution and stored for use as a coated carrier particle.

EXAMPLE II

The coated carrier particles of Example I were coupled to a biological substance, human chorionic gonadotropin (HCG) by use of a carbodiimide.

One-fourth (0.25) ml. of the packed BSA coated carrier particles were washed once with saline. Two (2) ml. of HCG containing 10 mg./ml. were added thereto and the preparation mixed. A solution of 0.2 g. of N,N'-dicyclohexyl carbodiimide in 0.5 ml. of tetrahydrofuran and 1 ml. of water was then added to the cell suspension. The preparation was incubated at room temperature for approximately 18 hours with continuous shaking. The cells were then washed three times with 20 ml. of 0.01 N sodium carbonate, and three times with 0.01 N HCl and three times with 30 ml. of distilled water in order to free them from excess coupling agent. Finally the cells were washed twice with 0.6% BSA in saline and resuspended to a 4% cell suspension in the same solution. The resulting product is composed of the E. coli carrier particles coated with the BSA and then presents an outer surface of the HCG which is coupled to the BSA coat through the carbodiimide coupling agent. This biological reagent was tested against rabbit antiserum to HCG and with normal rabbit serum using both the slide agglutination method and the micro-titrator agglutination method. The results indicated that the reagent formed was highly sensitive and specific to HCG with no non-specific agglutination occurring.

EXAMPLE III

Example II was repeated using the same carbodiimide coupling agent with 2 ml. of a solution containing 40 mg. of insulin in place of the HCG with a 2 ml. solution of human serum albumin (HSA) containing 10 mg. of the antigen. These biological reagents were similarly tested against rabbit antiserum to each of these biological substances and against normal rabbit serum with similar results.

EXAMPLE IV

The coated carrier particles of Example I were made reactive by addition of Woodward's Reagent L after an initial succinilation treatment. These reactive particles were then separately coupled to HSA and insulin.

One-fourth (0.25) ml. of the packed BSA coated carrier particles were centrifuged and the supernate then washed three times with distilled water. The supernate was then added to 20 ml. of 0.1% aqueous solution of sodium bicarbonate and mixed. Three (3) mg. of succinic anhydride was then added and the suspension shaken overnight at 4° C. The cells were then washed three times with distilled water, resuspended in 5 ml. of distilled water, and 10 microliters of triethylamine were added thereto with mixing. Seventeen (17) mg. of Woodward's Reagent L (N-tert-butyl-5-methylisoxazolium perchlorate) were then added and after 10 minutes the biological substance to be coupled was added.

For the first coupling 10 mg. HSA in 2 ml. of saline was added, the mixture shaken at 25° C. overnight, washed three times with distilled water, and resuspended in 5 ml. of distilled water. For agglutination and inhibition of agglutination testing the biological reagent is resuspended in 0.6% BSA in saline.

This coupling procedure was then repeated for a second coupling in which 2 ml. of a 0.2% solution of insulin in saline was added to the reactive particles in suspension.

EXAMPLE V

Coated carrier particles were made following the procedure of Example I with the exceptions that 10 mg. of BSA in 25 ml. saline and 10 ml. of the bis-diazobenzidine diluted 1:5 in phosphate buffered saline, pH 7.3, were used. These particles were then employed as carrier particles as follows. The coated particles were resuspended in phosphate buffer pH 7.3 to 7.4 and the following saline dilutions of antigenic active substances were added to separate batches thereof: horse gamma globulin—100 Au (antitoxin units) and 200 Au in 2.5 ml. saline; a mixture of human gamma globulin—20 mg. in 2.5 ml. saline and bovine gamma globulin in 2.5 ml. saline; human serum 1 ml. in 1.5 ml. saline; and human plasma 1 ml. in 1.5 ml. saline. Next 10 ml. of BDB diluted 1:80 in phosphate buffer, pH 7.3–7.4 was added to each batch and the resulting mixture was shaken for 20 to 30 minutes at room temperature to allow the reaction of the BDB with the carrier particles to form reactive particles and then coupling of the biological substances to the reactive particles through the BDB. The biological reagents were then separately washed with saline and resuspended in saline which for some of the batches contained 1% normal rabbit serum (NRS) or 0.6% BSA.

These biological reagents were then used for agglutination and inhibition of agglutination testing according to the micro-titrator technique. The results showed that the reagents allowed the specific detection of the attached antigens and their antibodies. Sedimentation times of about 6 to 8 hours were observed for these reagents as compared with 12 to 18 hours for reagents made with uncoated *E. coli* carrier particles.

EXAMPLE VI

Carrier particles were made with two primary coats, a first of BSA and a second of human gamma globulin, and were then coupled to an antigen, bovine gamma globulin. The first coat was added following the procedure of Example I with the exceptions that 5 ml. of a 2.5% suspension of formalinized *E. coli* cells, 10 mg. of BSA in 2.5 ml. saline, and 10 ml. of BDB diluted 1:5 in phosphate buffered saline, pH 7.3–7.4, were used.

Next 20 mg. of human gamma globulin in 2.5 ml. saline were added to 0.125 ml. of the packed cells and then 10 ml. of BDB diluted 1:80 in phosphate buffered saline were added and the mixture was placed on a rotary shaker for 20 minutes at room temperature. The preparation was then centrifuged and resuspended in saline and allowed to further react for 15 minutes at room temperature. The double coated carrier particles were then washed three times with saline and 20 mg. of bovine gamma globulin in 2.5 ml. saline were added to the packed cells and then 10 ml. of BDB diluted 1:160 in phosphate buffered saline were added. The mixture was placed on a rotary shaker for 20 minutes at room temperature and then centrifuged and treated as above to allow further reaction.

This biological reagent allowed immunological testing for bovine gamma globulin and its antibody.

A similar coated carrier particle was made up closely following the above procedure whereby the following primary layers were used: BSA, BSA, and human gamma globulin. The antigen coupled to this triple coated carrier particle was human gamma globulin.

EXAMPLE VII

Four 2 ml. batches of a 2.5% suspension of formalinized *E. coli* were washed three times in saline solution. After the last centrifugation the supernate was discarded and the packed cells were resuspended in 1 ml. of a sodium-potassium phosphate buffer, pH 8.4. Next the amounts of the coupling agents set out in Table 1 were added to the suspension of carrier particles when dissolved in 2% acetone and the preparation mixed and incubated for one-half hour at 37° C. and then centrifuged and resuspended in 1 ml. of the above pH 8.4 buffer. The proteinaceous materials listed in Table 1 were then added in the amounts set out in 0.25 ml. of the pH 8.4 buffer and the preparation mixed, incubated 1 hour at 37° C., centrifuged, washed three times with 5 ml. of phosphate buffered saline, pH 7.2, and resuspended in 1.5 ml. phosphate buffered saline. Next the antigenic active substances listed in Table 1 were added in the amounts set out in 1.5 ml. of saline solution and thereafter 5 ml. of BDB diluted 1:80 in phosphate buffered saline, pH 7.3–7.4 were added and the preparation placed on a rotary shaker for 20 minutes at room temperature to form the biological reagents. These were recovered by centrifugation, washed three times with saline solution and resuspended in saline for use.

TABLE 1

| Batch No. | Coupling agent, micrograms | Proteinaceous material, milligram | Antigenic active substance, milligram |
|---|---|---|---|
| 1 | DNDFB,[1] 25 | Bovine gamma globulin, 5. | BSA, 5. |
| 2 | DNDFB, 50 | BSA, 10 | Bovine gamma globulin, 2.5. |
| 3 | FNPS,[2] 25 | Bovine gamma globulin, 5. | BSA, 5. |
| 4 | FNPS, 50 | BSA, 10 | Bovine gamma globulin, 2.5. |

[1] 1,3-dinitro-4,6-difluorobenzene.
[2] p,p'-Difluoro-m,m'-dinitrodiphenyl sulfone.

These reagents were each successfully used for immunological testing for the presence of the antigenic active substances and their antibodies.

EXAMPLE VIII

Two (2) ml. of a 2.5% suspension of formalinized *E. coli* cells in phosphate buffered saline (PBS), pH 7.2–7.4, were mixed with 2.5 mg. of bovine gamma globulin in 3 ml. of PBS. Next 100 mg. of 1-ethyl-3(3-dimethyl aminopropyl) carbodiimide hydrochloride dissolved in 5 ml. of saline were added and the preparation incubated for 1 hour at room temperature with shaking. The coated carrier particles were then washed three times with 10 ml. of PBS containing 1% normal rabbit serum. The particles were then resuspended in 1.5 ml. of saline containing 1% NRS.

These coated carrier particles were then washed once with phosphate buffer, pH 8.4, resuspended in 1.5 ml. thereof and then 5 mg. of BSA suspended in 1.5 ml. saline and 5 ml. of BDB diluted 1:80 in phosphate buffered saline, pH 7.2–7.4, were mixed therewith. The preparation was then treated as in Example 1. It was a usable immunological reagent.

EXAMPLE IX

Coated carrier particles were made following the procedure of Example I using 5 ml. of the formalinized *E. coli* cells, 1.25 ml. of saline containing 5 mg. of bovine gamma globulin, and 10 ml. of BDB diluted 1:40 in phosphate buffered saline, pH 7.2–7.4. Next an outer coat of bovine gamma globulin was placed on the particles using a two-step BDB coupling method in which the coated particles were contacted with 5 ml. of BDB diluted 1:80 in phosphate buffered saline and allowed to react therewith for about 20 minutes at room temperature. The resulting reactive particles were washed with saline and then 5 mg. of bovine gamma globulin in 1.25 ml. saline were added thereto and the reaction therebetween allowed to proceed for 18 hours at room temperature with continuous shaking, after which they were treated in the same manner as in Example V.

This two step coupling method results in the reactive particles being separately formed by use of BDB without the biological substance being present.

EXAMPLE X

Following the procedures set out in the several above examples a number of coated particles were made for use in preparing biological reagents of the type disclosed herein. Table 2 shows the carrier particles, coupling agents, and proteinaceous materials employed, together with the amounts thereof in the following diluents: for the carrier particles—saline; for BDB—phosphate buffered saline, pH 7.2–7.4; for the carbodiimides—tetrahydrofuran; for Woodward's reagent—the treatment and diluent of Example IV; and for the proteinaceous materials—saline.

TABLE 2

| Carrier particles, 10 ml. of 2.5% suspension | Coupling agent and amount | Proteinaceous material and amount |
| --- | --- | --- |
| E. coli | DCC [1] carbodiimide, 0.2 g. in 0.5 ml | Human serum albumin, 10 mg. in 2 ml. |
| E. coli | Woodward's Reagent L, 17 mg | Do. |
| E. coli | do | Horse gamma globulin, 400 Au in 2 ml. |
| E. coli | BDB, 20 ml. of 1:5 dilution | Human serum albumin, 3 mg. in 5 ml. |
| E. coli | do | Horse gamma globulin, 200 Au in 5 ml. |
| E. coli | Merler [1] carbodiimide, 0.05 mg. in 5 ml | Human serum albumin, 10, 20, 40 and 80 mg. in 1 ml. |
| Lactobacillus leichmannii | BDB, 20 ml. of 1:5 dilution | BSA, 40 mg. in 5 ml. |
| Lactobacillus leichmannii | do | Horse gamma globulin, 200 Au in 5 ml. |
| Bacillus pumilus | do | Human serum albumin, 3 mg. in 5 ml. |
| Bacillus pumilus | do | Horse gamma globulin, 200 Au in 5 ml. |
| Bacillus pumilus | Woodward's Reagent L, 17 mg | Human serum albumin, 10 mg. in 2 ml. |
| Bacillus subtilis | BDB, 20 ml. of 1:5 dilution | Human serum albumin, 3 mg. in 5 ml. |
| Bacillus subtilis | do | Horse gamma globulin, 200 Au in 5 ml. |
| Pseudomonas fragi | do | Human serum albumin, 3 mg. in 5 ml. |
| Pseudomonas fragi | do | Horse gamma globulin, 200 Au in 5 ml. |
| Pseudomonas fragi | DCC [1] carbodiimide, 0.2 g. in 0.5 ml | Human serum albumin, 10 mg. in 2 ml. |

[1] DCC carbodiimide is N,N'-dicyclohexyl carbodiimide and Merler carbodiimide is 1-cyclohexyl-3(2-morpholinyl-(4)-ethyl carbodiimide) metho-p-toluenesulfonate.

Each of these coated carrier particles can be employed with the coupling agents set out herein to produce reactive particles which can be used to insolubilize a wide range of biological substances and to produce reagents therefrom.

EXAMPLE XI

The coated carrier particles can be lyophilized for dry storage. A procedure for lyophilization is as follows.

Five (5) ml. of a 2.5% suspension of formalinized E. coli cells were washed three times with saline, resuspended in 3 ml. of phosphate buffered saline, pH 7.2–7.4, and 2.5 mg. of HCG (2590 I.U./mg.) dissolved in 2.5 ml. saline were added thereto. Next, 10 ml. of a 1:5 dilution of BDB in phosphate buffered saline, pH 7.2–7.4 were added and the preparation rotated 20 minutes and then washed once with saline and twice with saline containing 0.6% BSA. The cell concentration was then adjusted to 3 to 4% after centrifugation by adding saline containing 0.6% BSA and 6% sucrose. This preparation was then deposited as separate drops of glass slides and in 0.5 to 1.0 ml. quantities in glass vials and lyophilized for 24 to 48 hours at −40° C. to −51° C. under a vacuum of less than about 150 microns mercury. The glass vials are capped under vacuum and stored in a low humidity area. The coated particles thus dried are stable for indefinite periods.

What is claimed is:

1. An immunological reagent comprising discrete cells of uniform shape and size selected from the group consisting of red blood cells and bacterial cells covalently bound to a proteinaceous material selected from the group consisting of bovine serum albumin, human serum albumin, horse gamma globulin and human gamma globulin with a coupling agent selected from the group consisting of bis diazobenzidine, dicyclohexylcarbodiimide, N-t-butyl-5-methylisoxazolium perchlorate, dinitrodifluorobenzene, difluorodinitrodiphenylsulfone and 1-cyclohexyl-3-(2-morpholinyl - 4 - ethyl carbodiimide) metho-p-toluenesulfonate and covalently bound to said proteinaceous material with said coupling agent an antigen selected from the group consisting of human chorionic gonadotropin, insulin, bovine serum albumin, human serum albumin, horse gamma globulin and human gamma globulin.

2. The reagent of claim 1 in which the bacterial cell is selected from the group consisting of E. coli, L. leichmannii, B. subtilis, B. pumilus and P. fragi.

3. The reagent of claim 1 comprising E. coli covalently bound to bovine serum albumin with bis diazobenzidine and the antigen is human chorionic gonadotropin covalently bound to said bovine serum albumin with dicyclohexylcarbodiimide.

4. The reagent of claim 1 comprising E. coli covalently bound to bovine serum albumin with bis diazobenzidine and the antigen is insulin covalently bound to said bovine serum albumin with N-t-butyl-5-methylisoxazolium perchlorate.

5. The reagent of claim 1 comprising E. coli covalently bound to bovine serum albumin with bis diazobenzidine and the antigen is human gamma globulin covalently bound to said bovine serum albumin with bis diazobenzidine.

6. The reagent of claim 1 comprising E. coli covalently bound to bovine serum albumin and human gamma globulin with bis diazo benzidine and the antigen is bovine gamma globulin covalently bound to said bovine serum albumin and human gamma globulin with bis diazobenzidine.

7. The reagent of claim 1 comprising E. coli covalently bound to bovine gamma globulin with dinitrodifluorobenzene and the antigen is bovine serum albumin covalently bound to said bovine gamma globulin with bis diazobenzidine.

References Cited

UNITED STATES PATENTS 3,236,732   2/1966   Arquilla _____ 424—12

FOREIGN PATENTS 6504823   10/1966   Netherlands.

OTHER REFERENCES

Howard, Biochem. J., vol. 65, 1957, pp. 651–58.
Stavitsky, Int. Arch. Allergy, vol. 13, 1958, pp. 1–38.

STANLEY J. FRIEDMAN, Primary Examiner

A. P. FAGELSON, Assistant Examiner

U.S. Cl. X.R.

424—3; 195—63, 68, 103.5